United States Patent
Wunderlich (10) Patent No.: US 9,669,519 B2
(45) Date of Patent: Jun. 6, 2017

(54) WORK PIECE HOLDER AND METHOD OF USING A WORK PIECE HOLDER TO SUPPORT A WORK PIECE

(71) Applicant: Gulfstream Aerospace Corporation, Savannah, GA (US)

(72) Inventor: Bruce Wunderlich, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 0 days.

(21) Appl. No.: 14/754,289

(22) Filed: Jun. 29, 2015

(65) Prior Publication Data

US 2016/0375557 A1 Dec. 29, 2016

(51) Int. Cl.
| | |
|---|---|
| *B25B 5/06* | (2006.01) |
| *B25B 5/14* | (2006.01) |
| *B25B 5/08* | (2006.01) |
| *B64F 5/00* | (2017.01) |

(52) U.S. Cl.
CPC ............... *B25B 5/145* (2013.01); *B25B 5/08* (2013.01); *B64F 5/0009* (2013.01)

(58) Field of Classification Search
CPC .. B25B 1/08; B25B 5/02; B25B 5/163; B25B 7/14; B25B 9/02
See application file for complete search history.

(56) References Cited

U.S. PATENT DOCUMENTS

| | | | | |
|---|---|---|---|---|
| 2,893,275 | A * | 7/1959 | Lindemann | B23Q 3/00 269/234 |
| 3,899,162 | A * | 8/1975 | Fischer | B25B 1/18 269/25 |
| 4,804,171 | A * | 2/1989 | Dornfeld | B25B 5/08 269/138 |
| 6,126,159 | A * | 10/2000 | Dornfeld | B25B 5/08 269/138 |
| 6,523,818 | B1 * | 2/2003 | Le Vert | B25B 5/147 211/13.1 |
| 6,530,566 | B1 * | 3/2003 | DuVernay | B25B 5/12 269/201 |
| 8,695,957 | B2 * | 4/2014 | Quintania | B25B 5/006 248/309.1 |

* cited by examiner

*Primary Examiner* — Lee D Wilson
(74) *Attorney, Agent, or Firm* — LKGlobal | Lorenz & Kopf, LLP (57) ABSTRACT

A work piece holder including, but not limited to, a bracket having a first arm, a second arm, and a gap between the first arm and the second arm. A first portion of the second arm is non-parallel with a first portion of the first arm such that a lower portion of the gap is narrower than an upper portion. The work piece holder further includes a wedge having a first side and a second side. The second side is configured to engage the first portion of the second arm. The wedge is configured to move along the first portion of the second arm. The wedge and the first arm support the work piece when the work piece is positioned in the gap and the wedge has moved along the first portion of the second arm to a position where it engages the work piece.

18 Claims, 8 Drawing Sheets

WORK PIECE HOLDER AND METHOD OF USING A WORK PIECE HOLDER TO SUPPORT A WORK PIECE

TECHNICAL FIELD

The present invention generally relates to manufacturing and more specifically relates to an apparatus for supporting a work piece and a method of using a work piece holder to support a work piece.

BACKGROUND

The manufacture of aircraft and other products frequently requires that work be performed on relatively large work pieces, such as sheets of metal, outer surface skins, inner compartment panels, bulkheads, monuments, and the like. The types of operations that may need to be performed on such work pieces include, but are not limited to, sanding, routing, drilling, and sawing. These operations require that the work piece be held securely in place. However, because of the dimensions of these work pieces, conventional methods of holding these work pieces securely in place may not be adequate. This has led to non-conventional methods of securing the work pieces such as propping the work pieces against walls, stacking sand bags against the work piece, using multiple vices to secure the work piece to a work bench, or just simply holding the work piece steady with one hand while performing an operation on the work piece with the other hand. While these non-conventional methods of holding a work piece in place can be effective, they are undesirable and there is ample room for improvement.

BRIEF SUMMARY

A work piece holder and a method of using a work piece holder to support a work piece are disclosed herein.

In a first non-limiting embodiment, the work piece holder includes, but is not limited to, a bracket having a first arm and a second arm. There is a gap between the first arm and the second arm. A first portion of the second arm is non-parallel to a first portion of the first arm such that a lower portion of the gap is narrower than an upper portion of the gap. The work piece holder further includes, but is not limited to a wedge that is configured to at least partially fit in the gap. The wedge has a first side and a second side. The second side is configured to engage the first portion of the second arm. The wedge is configured to move along the first portion of the second arm. The first side and the first portion of the first arm are configured to cooperate to support the work piece when the work piece is positioned in the gap while the second side is engaged with the first portion of the second arm and when the wedge has moved along the first portion of the second arm to a position where the first side engages the work piece.

In another non-limiting embodiment, the work piece holder includes, but is not limited to, a bracket that is adapted to be supported on a surface. The bracket has a first arm and a second arm. The first arm and the second arm extend in a substantially upright direction. The second arm has a canted surface that is non-parallel to the first arm. There is a gap between the first arm and the second arm. The canted surface forms a boundary of the gap such that a lower portion of the gap is narrower than an upper portion of the gap. The work piece holder further includes, but is not limited to, a wedge that is configured to at least partially fit in the gap. The wedge has a generally triangular shape, a first side, and a second side. The second side is configured for sliding engagement with the canted surface. The wedge is configured such that the first side is substantially parallel to the first arm when the wedge is positioned in the gap and engaged with the canted surface. The wedge and the canted surface are configured such that the first side remains substantially parallel to the first arm as the second side slides along the canted surface. The first side of the wedge and a first surface of the first arm are configured to cooperate to support the work piece when the work piece is positioned in the gap while the second side of the wedge is engaged with the canted surface and when the wedge has moved along the canted surface to a position where the first side engages the work piece.

In another non-limiting embodiment, the method includes, but is not limited to, the step of positioning the work piece in a gap in a bracket. The bracket has a first arm and a second arm. The gap is disposed between the first arm and the second arm. A first portion of the second arm is non-parallel to a first portion of the first arm such that a lower portion of the gap is narrower than an upper portion of the gap. The method further includes, but is not limited to, positioning a wedge in the gap. The wedge has a first side and a second side. The second side is configured to engage the first portion of the second arm. The wedge is configured to move along the first portion of the second arm. The first side and the first portion of the first arm are configured to cooperate to support the work piece when the work piece is positioned in the gap. The method further includes, but is not limited to, engaging the first portion of the second arm with the second side of the wedge. The method still further includes, but is not limited to, moving the wedge along the first portion of the second arm until the first side of the wedge and the first portion of the first arm engage the work piece.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

An improved work piece holder is disclosed herein that addresses the issues raised above in the background section. In a non-limiting embodiment, the work piece holder includes, but is not limited to, a bracket and a wedge. In an embodiment, the bracket is adapted to be supported on a floor or ground surface and includes two upwardly extending arms with a gap or slot disposed between them. In an embodiment, one of the arms includes a canted surface that acts as a camming surface for the wedge. The work piece is placed in the gap between the two arms. Then the wedge is placed in the gap in a position that causes it to engage the canted surface. Once the wedge is engaged with the canted surface, the wedge is moved in a downward direction, either under the force of gravity or under the force exerted by an operator. As the wedge moves in a downward direction, the canted surface acts as a camming surface and urges the wedge towards the work piece. As the wedge continues moving down the canted surface, it makes contact with the work piece. As further downward force is applied to the wedge, the wedge pushes against the work piece which is compressed between, and supported by, the wedge and the non-canted arm of the bracket. Compression exerted by the combination of the wedge and the non-canted arm of the bracket combine to hold the work piece in place. After an operator stops pushing down on the wedge, the force of gravity continues to act on the wedge, causing it to remain compressed against the work piece.

With the work piece compressed between the wedge and the non-canted arm of the bracket, the work piece is secure and the operator can perform whatever tasks are needed on the work piece. If the operator would like to position the work piece at a higher position, the operator need only lift up on the work piece. This upward directed force will act against the gravity holding the wedge in place and will move the wedge partially back up the canted surface. As this happens, the compression acting on the work piece is diminished and it is free to rise. When the work piece has been moved to a desirable elevated position, the operator need only push down again on the wedge to cause it to re-engage the work piece and support it with compression and friction in cooperation with the non-canted arm of the bracket.

A greater understanding of the work piece holder and of the method of using a work piece holder to support a work piece may be obtained through a review of the illustrations accompanying this Application together with a review of the detailed description that follows.

Figure 1:
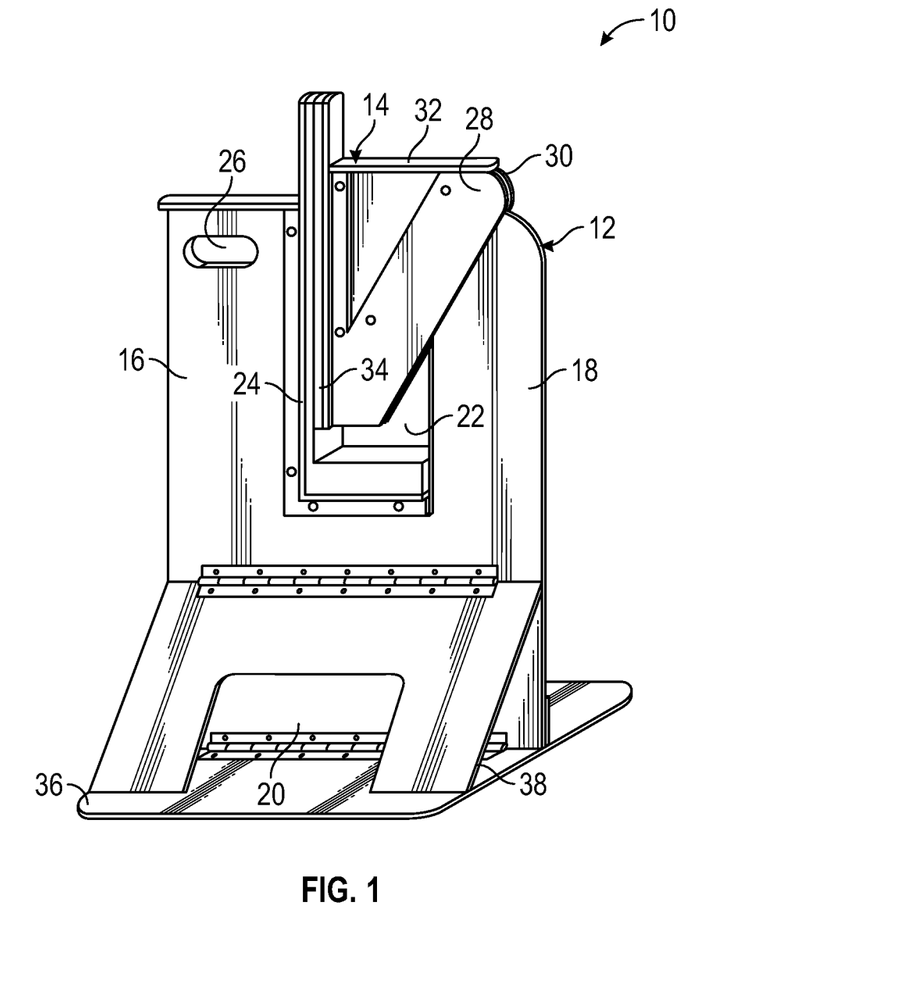
FIG. 1 is a perspective view illustrating a non-limiting embodiment of work piece holder made in accordance with the teachings of the present disclosure.

FIG. 1 is a perspective view illustrating a non-limiting embodiment of a work piece holder 10 made in accordance with the teachings of the present disclosure. Work piece holder 10 includes a bracket 12 and a wedge 14. Bracket 12 is a generally U-shaped component and includes an arm 16 and an arm 18 extending upward from a lower portion 20 that connects arm 16 to arm 18. Arm 16 and arm 18 are spaced apart to form a gap 22 (gap 22 is partially visible in FIG. 1, but can be best seen in FIG. 2). A compressible member 24 is attached to arm 16 at a location that faces into gap 22. Compressible member 24 facilitates the ability of work piece holder 10 to hold a work piece by adjusting as needed to the surface of the work piece to accommodate work pieces having non-uniform surfaces or non-uniform surface features. Compressible member 24 may comprise any suitable material including, but not limited to, a foam material, a rubber material, a polymeric material, and combinations thereof. An opening is defined through arm 18 forming a handle 26 to permit an operator to carry work piece holder 10 from work station to work station. In other embodiments, handle 26 may be disposed at any suitable location on bracket 12 and may be oriented at any suitable angle to facilitate transport of work piece holder 10.

With continuing reference to FIG. 1, wedge 14 has a truncated triangular shape that is configured slide along a canted portion of arm 18 to cooperate with bracket 12 to secure a work piece when a work piece is positioned in gap 22. Its truncated triangular shape also enables wedge 14 to nest within gap 22 when a work piece is not present. In other embodiments, wedge 14 may have a triangular shape or any other shape that is suitable for cooperating with bracket 16 to support a work piece.

Figure 6:
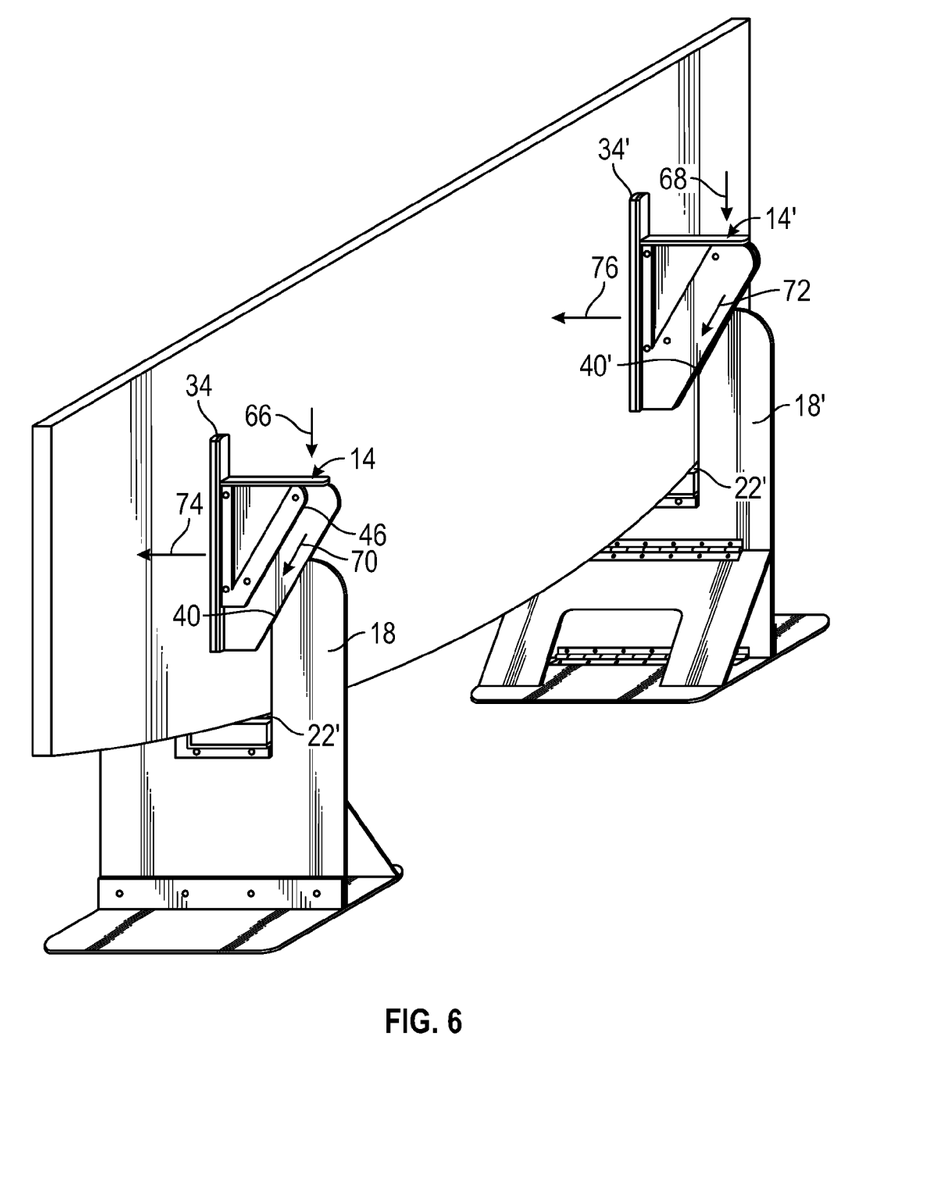
FIG. 6 is perspective view illustrating the two wedges of FIG. 5 engaging an arm of each respective bracket and moving further into the respective gaps of each bracket.

Wedge 14 includes an outer plate 28 and an outer plate 30 that sandwich an inner member 32 (inner member 32 is partially visible in FIG. 1, but can be best seen in FIG. 6). One side of inner member 32 is configured to engage and slide along the canted portion of arm 18 (as best seen in FIG. 6) while an opposite side of inner member 32 includes a compressible member 34 that is configured to compress against a work piece. Compressible member 34 may comprise any suitable material including, but not limited to, a foam material, a rubber material, a polymeric material, and combinations thereof. The compressibility of compressible member 34 facilities the ability of wedge 14 to cooperate with bracket 16 to support a work piece. Outer plate 28 and outer plate 30 extend beyond a periphery of compressible member 34 to permit wedge 14 to engage the canted portion of arm 18 in a tongue-in-groove manner. This configuration stabilizes wedge 14 as it slides up and down along the canted portion of arm 18. In other embodiments, arm 18 may be configured with outer plates and wedge 14 may be configured without outer plates to provide an alternate configuration that permits tongue-in-grove engagement between wedge 14 and the canted portion of arm 18. In still other embodiments, other tongue-in-groove configurations are possible that provide a robust and stable engagement between wedge 14 and arm 16. In still other embodiments, wedge 14 may engage arm 18 in any other suitable manner.

In the illustrated embodiment, bracket 12 is mounted to a base 36. Base 36 supports bracket 12 and provides a stable platform from which to perform various manufacturing operations on a work piece. In the illustrated embodiment, bracket 12 is pivotally mounted to base 36. In some embodiments, this pivotal mounting arrangement permits bracket 12 to be supported at selectable angles with respect to the floor or ground surface. This pivotal mounting arrangement further permits easy and convenient storage of work piece holder 10 when it is not in use by enabling bracket 12 and wedge 14 (when nested in bracket 12) to be folded down and laid against base 36 to provide a relatively flat and compact profile.

Bracket 12, wedge 14, base 36, and each of their components/parts may be made of any suitable material. In some embodiments, Bracket 12, wedge 14, and base 36 may be fabricated from any suitable wood material. In other embodiments, bracket 12, wedge 14, and base 36 may be made from any suitable metal material. In still other embodiments, bracket 12, wedge 14, and base 36 may be made from any suitable polymeric material. In still other embodiments, bracket 12, wedge 14, and base 36 may each be made from different materials.

A lock 38 is pivotally mounted to base 36. Lock 38 is configured to engage with bracket 12 and to support bracket 12 in an upright orientation or, in some embodiments, to support bracket 12 at any desirable orientation. In other embodiments, lock 38 may be pivotally mounted to bracket 12 and may engage base 36 to lock bracket 12 at a desirable orientation. In still other embodiments, work piece holder 10 may omit both base 36 or lock 38 or both and instead be supported directly on a floor or ground surface by lower portion 20.

Figure 2:
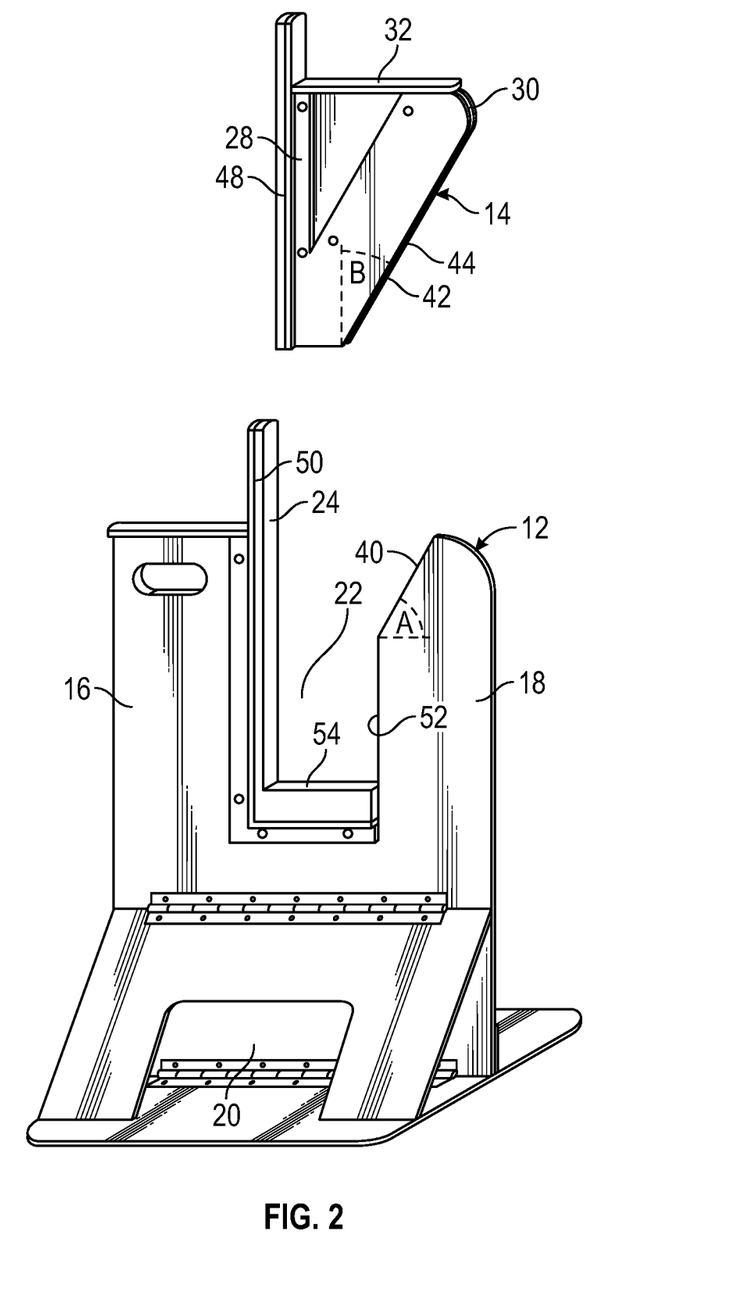
FIG. 2 is an exploded view illustrating the work piece holder of FIG. 1.

FIG. 2 is an exploded view illustrating wedge 14 disengaged from bracket 12. In this view, a canted surface 40 of arm 18 is visible. In the illustrated embodiment, canted surface 40 has an angle A of approximately 60 degrees elevated above a horizontal orientation. Correspondingly, outer plate 28, outer plate 30, and inner member 32 each have canted surfaces 42, 44, and 46, respectively (canted surface 46 is best seen in FIG. 6) that are configured to complement canted surface 40. Configured in this manner, canted surfaces 42, 44, and 46 enable a supporting side 48 of wedge 14 to be maintained in an orientation that conforms to a supporting side 50 of arm 16. In the illustrated embodiment, canted surfaces 40, 42, and 44 are each canted at an angle B of approximately thirty degrees. As a result, when canted surfaces 42, 44, and 46 are engaged with canted surface 40, supporting side 48 will be supported in a substantially vertical orientation that is aligned with supporting side 50. Arranged in this manner, supporting side 48 will maintain its vertical orientation and alignment with supporting side 50 as wedge 14 moves up and down along canted surface 40. Although the illustrated embodiment illustrates both supporting side 50 and supporting side 48 as being oriented vertically, it should be understood that in other embodiments, supporting side 50 and supporting side 48 may be disposed in a non-vertical orientation without departing from the teachings of the present disclosure.

As seen in FIG. 2, a vertical surface 52 is disposed below canted surface 40. Also visible in FIG. 2, lower portion 20 includes a shelf 54. Accordingly, gap 22 is bounded by compressible member 24, shelf 54, vertical surface 52, and canted surface 40. Positioning vertical surface 52 below canted surface 40 leaves room for shelf 54 and results in a configuration that permits a relatively thick work piece and/or multiple work pieces to be placed in gap 22. This configuration also permits the work piece to be supported on shelf 54, which is relatively flat, while an operator retrieves and positions wedge 14 into gap 22. In other embodiments, vertical surface 52 and shelf 54 may be omitted and canted surface 40 may extend down to a lower portion of supporting side 50, giving gap 22 a canted V-shaped configuration. Other configurations are also possible.

In operation, it may be desirable to use two or more work piece holders 10 to support large work pieces. This is illustrated in FIGS. 3-7 which depict the use of two work piece holders to support a work piece 60.

Figure 3:
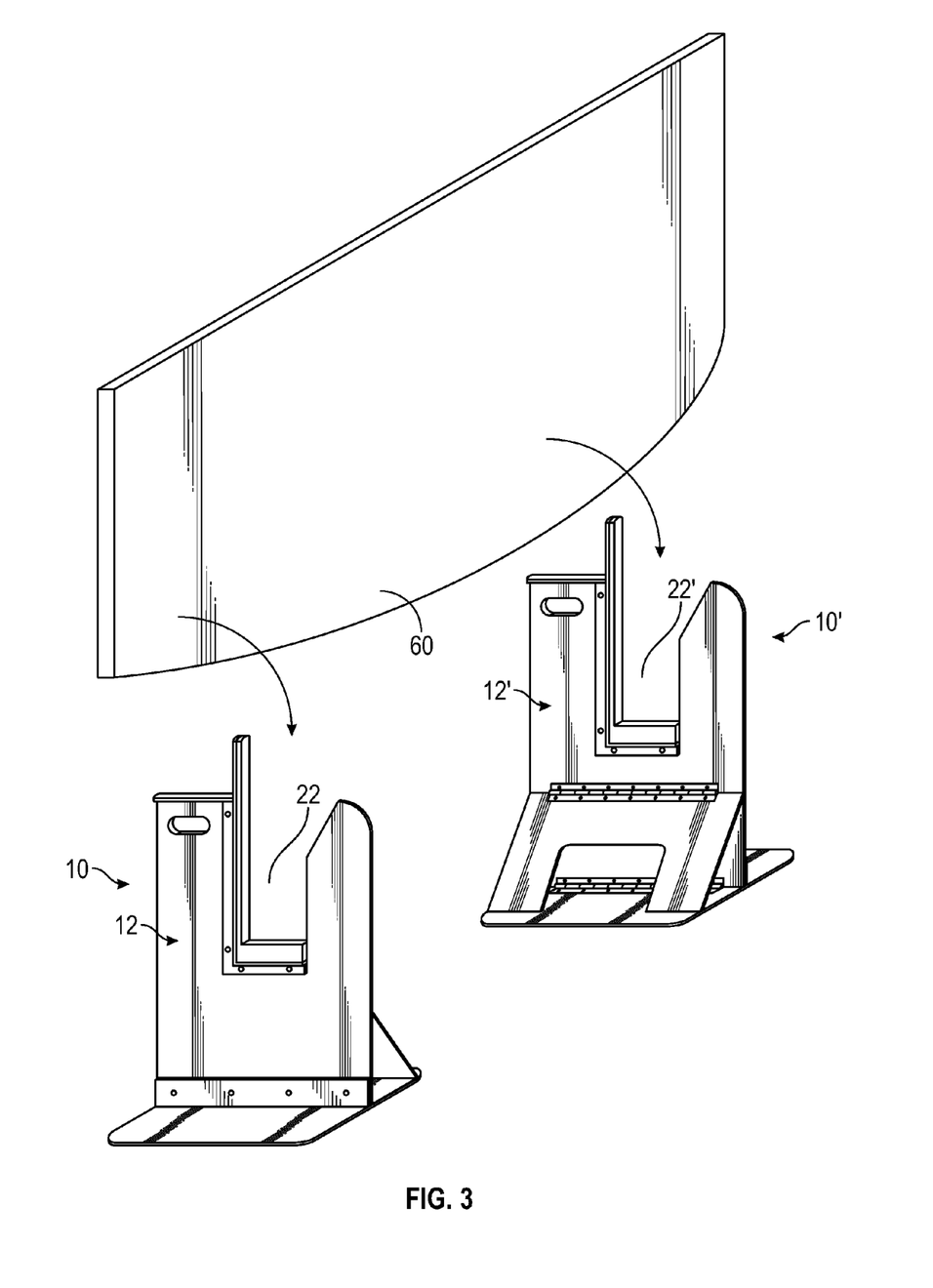
FIG. 3 is a perspective view illustrating two brackets of two work piece holders of FIG. 1 arranged to receive a work piece in a gap in each bracket.

With continuing reference to FIGS. 1-2, as illustrated in FIG. 3, bracket 12 of work piece holder 10 is aligned with a bracket 12' of a work piece holder 10'. Arranged in this manner, gap 22 and a gap 22' are aligned to receive work piece 60. Additional brackets may be placed in alignment, as needed, to support even larger work pieces.

Figure 4:
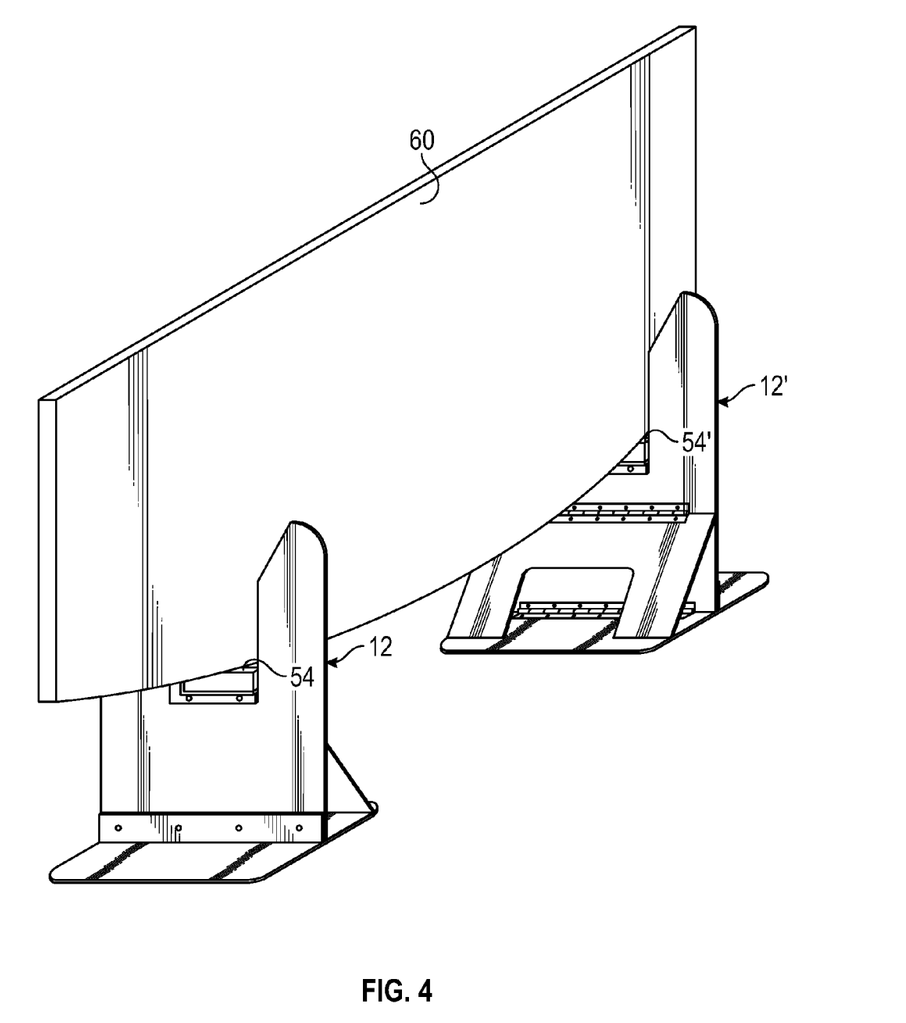
FIG. 4 is a perspective view illustrating the two brackets of FIG. 3 supporting the work piece in the respective gap in each bracket.

As illustrated in FIG. 4, work piece 60 has been positioned in gap 22 and gap 22' and rests on shelf 54 and shelf 54' of brackets 12 and 12'. Supported in this manner, an operator can safely release his or her grasp on work piece 60 and retrieve wedge 14 and a wedge 14'(see FIG. 5).

Figure 5:
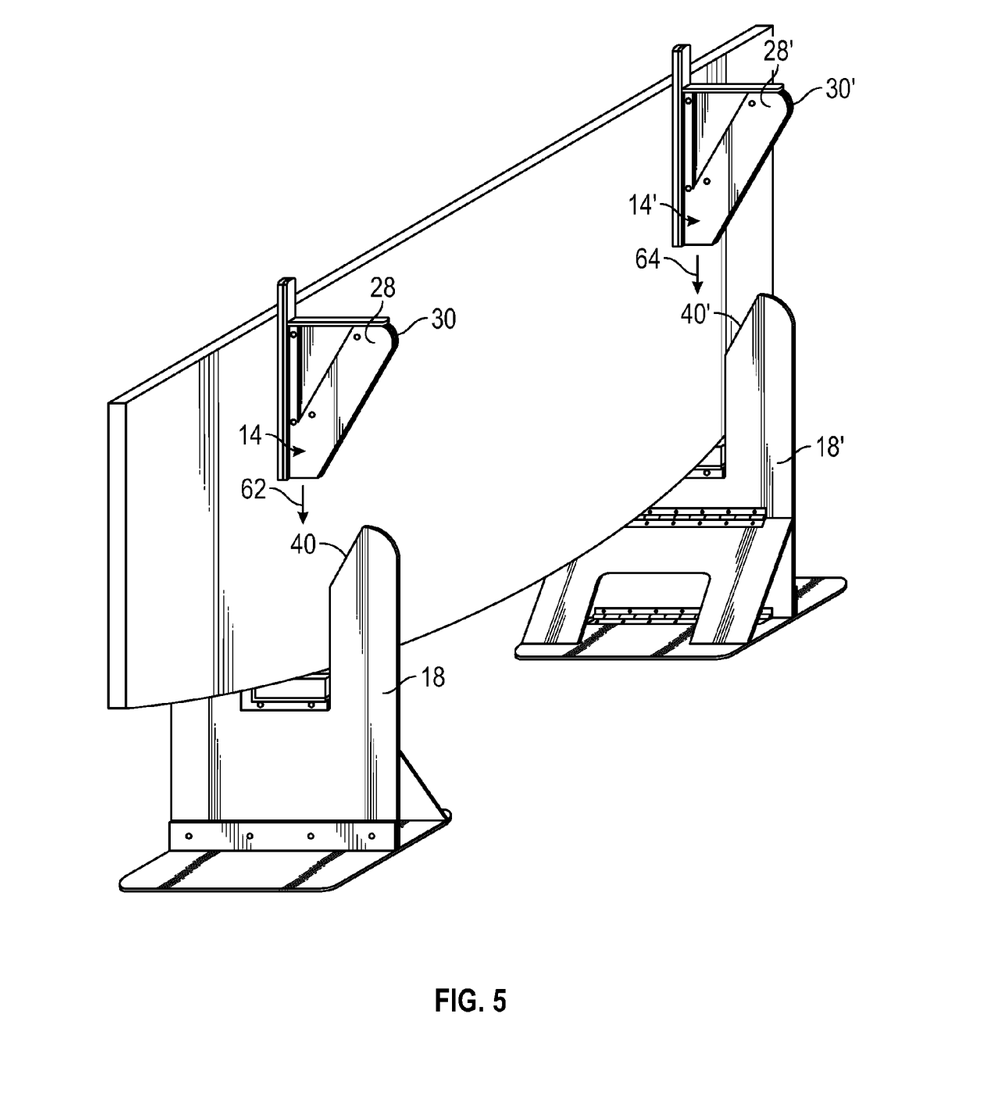
FIG. 5. is a perspective view illustrating two wedges of two work piece holders of FIG. 1 being positioned in each respective gap in each bracket.

As illustrated in FIG. 5, wedge 14 and wedge 14' are positioned over arm 18 and an arm 18', respectively. Wedge 14 and wedge 14' are aligned such that a channel formed by inner member 32 and outer plates 28 and 30 and a channel formed by an inner member 32' and an outer plate 28' and an outer plate 30' each aligned with canted surface 40 and a canted surface 40', respectively. Positioned in this manner, wedge 14 and wedge 14' may be lowered in the direction indicated by arrows 62 and 64 until each channel envelops arm 18 and arm 18' at canted surface 40 and canted surface 40', respectively.

As illustrated in FIG. 6, wedges 14 and 14' are engaged with arms 18 and 18'. With continuing reference to FIGS. 1-5, outer plate 28 has been omitted from FIG. 6 to reveal the engagement between canted surface 46 and canted surface 40. Canted surface 46 and canted surface 40 are each relatively flat and relatively smooth surfaces that are configured to slide with respect to one another when they are brought into contact with one another. Accordingly, when an operator applies a force to wedge 14 and to wedge 14' and directs that force in the direction indicated by arrows 66 and 68, respectively, wedges 14 and 14' will each slide along canted surfaces 40 and 40' in the direction indicated by arrows 70 and 72, respectively. As wedges 14 and 14' slide along canted surfaces 40 and 40', wedges 14 and 14' also move in the direction indicated by arrows 74 and 76 as a result of the camming action of canted surface 40 and canted surface 40'. This camming action drives wedges 14 and 14' towards work piece 60. This movement towards work piece 60 will continue until compressible member 34 and a compressible member 34' engage work piece 60. In some embodiments, it may not be necessary for an operator to apply any downward force to wedges 14 and 14'. Rather, the force of gravity may be sufficient to move wedges 14 and 14' along canted surfaces 40 and 40'.

Figure 7:
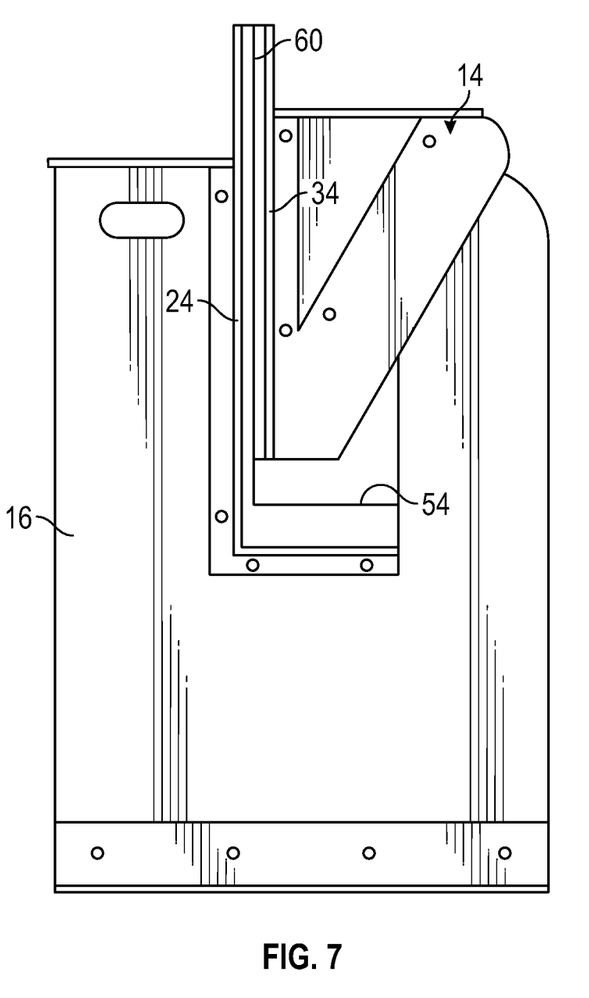
FIG. 7 is a side view of the arrangement of FIG. 6 illustrating the wedge and the bracket cooperating to support the work piece.

FIG. 7 is a side view illustrating bracket 12 and wedge 14 cooperating to support work piece 60. Work piece 60 is sandwiched between compressible member 24 and compressible member 34 and supported in a substantially vertical orientation. Supported in the manner illustrated, an operator can perform various operations to work piece 60 without concern that work piece 60 will shift. As illustrated in FIG. 7, work piece 60 rests on shelf 54. If the operator desires to reposition work piece 60 to a higher elevation, the operator need only lift up on work piece 60 to reposition it to the desired height and then release it. The force of gravity, the force of friction between work piece 60 and compressible surfaces 24 and 34, and the camming action of canted surface 40 (see FIG. 6) will all act in concert to drive wedge 14 towards arm 16, thereby compressing work piece 60 between compressible members 24 and 34. This compression will cause work piece 60 to remain at the new height, elevated above shelf 54.

Figure 8:
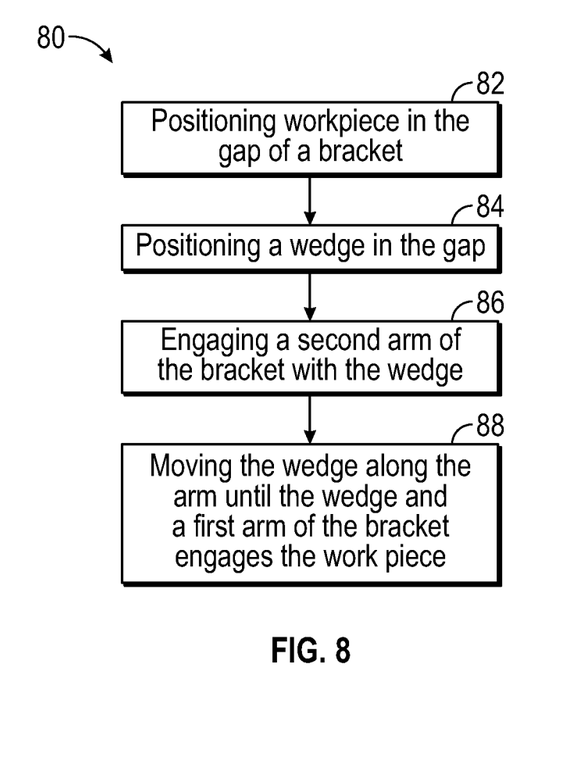
FIG. 8 is a flow diagram illustrating a non-limiting embodiment of a method of supporting a work piece using a work piece holder.

FIG. 8 is a flow diagram illustrating a non-limiting embodiment of a method 80 of using a work piece holder to support a work piece. At step 82, an operator positions a work piece in a gap between a first arm and a second arm of a bracket. A first portion of the second arm is canted so as to be non-parallel to a first portion of the first arm. This canted surface causes a lower portion of the gap to be narrower than an upper portion of the gap. This arrangement results in a camming surface which enables a wedge to compress against the work piece and to support the work piece in cooperation with the first arm, as discussed below.

At step 84, the wedge is positioned in the gap. A first side of the wedge is configured to engage the work piece and a second side of the wedge is configured to engage and slide along the canted surface of the second arm.

At step 86, the second side of the wedge is engaged with the canted surface of the second arm. In an embodiment, the second side of the wedge engages the canted surface of the first arm in a tongue-in-groove manner to provide a stable and robust sliding engagement.

At step 88, the wedge is moved along the canted surface of the second arm of the bracket until the first side of the wedge engages the work piece. At this point, the wedge, in cooperation with the first arm of the bracket, supports the work piece. An operator may push down firmly on the wedge to increase the compression on the work piece and thereby more robustly support the work piece.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A work piece holder comprising:
a bracket having a first arm and a second arm, there being a gap between the first arm and the second arm, a first portion of the second arm being non-parallel to a first portion of the first arm such that a lower portion of the gap is narrower than an upper portion of the gap; and
a wedge configured to at least partially fit in the gap, the wedge having a first side and a second side, the second side configured to engage the first portion of the second arm, the wedge configured to move along the first portion of the second arm, and the first side and the first portion of the first arm configured to cooperate to support the work piece when the work piece is positioned in the gap while the second side is engaged with the first portion of the second arm and when the wedge has moved along the first portion of the second arm to a position where the first side engages the work piece, and
wherein the second side of the wedge is configured to engage the first portion of the second arm in a tongue-in-groove manner.

2. The work piece holder of claim 1, wherein the wedge is further configured such that a portion of the first side is parallel to the first portion of the first arm when the second side is engaged with the first portion of the second arm.

3. The work piece holder of claim 2, wherein the portion of the first side remains parallel to the first portion of the first arm as the wedge moves along the first portion of the second arm.

4. The work piece holder of claim 1, wherein the first arm is substantially vertical.

5. The work piece holder of claim 4, wherein a second portion of the second arm is disposed below the first portion of the second arm, the second portion of the second arm is parallel to the first portion of the first arm and spaced apart from the first arm.

6. The work piece holder of claim 4, wherein the first portion of the second arm is canted at an angle of substantially sixty degrees with respect to a horizontal direction.

7. The work piece holder of claim 1, wherein the first side of the wedge and the first portion of the first arm are at least partially covered by a compressible material.

8. The work piece holder of claim 7, wherein the compressible material comprises one of a foam material and a rubber material and a polymeric material.

9. A work piece holder comprising:
a bracket adapted to be supported on a surface, the bracket having a first arm and a second arm, the first arm and the second arm extending in a substantially upright direction, the second arm having a canted surface that is non-parallel to the first arm, there being a gap between the first arm and the second arm, the canted surface forming a boundary of the gap such that a lower portion of the gap is narrower than an upper portion of the gap;
a wedge configured to at least partially fit in the gap, the wedge having a generally triangular shape, a first side, and a second side, the second side configured for sliding engagement with the canted surface, the wedge configured such that the first side is substantially parallel to the first arm when the wedge is positioned in the gap and engaged with the canted surface, and the wedge and the canted surface are configured such that the first side remains substantially parallel to the first arm as the second side slides along the canted surface, and the first side of the wedge and a first surface of the first arm configured to cooperate to support the work piece when the work piece is positioned in the gap while the second side of the wedge is engaged with the canted surface and when the wedge has moved along the canted surface to a position where the first side engages the work piece; and
a compressible material disposed on the first side of the wedge and on the first surface of the first arm.

10. The work piece holder of claim 9, further comprising a base supporting the bracket.

11. The work piece holder of claim 10, wherein the bracket is pivotally mounted on the base.

12. The work piece holder of claim 11, further comprising a lock that engages the bracket and that supports the bracket at a predetermined orientation with respect to the base when the lock is engaged.

13. The work piece holder of claim 9, wherein the second arm includes a vertical surface disposed below the canted surface, the vertical surface being substantially parallel to the first arm and spaced apart from the first arm.

14. The work piece holder of claim 9, wherein the second side of the wedge is configured to engage the canted surface in a tongue-in-groove manner.

15. The work piece holder of claim 9, wherein the canted surface is canted at an angle of substantially sixty degrees with respect to a horizontal direction.

16. The work piece holder of claim 9, wherein the compressible material comprises at least one of a foam material, a rubber material, and a polymeric material.

17. The work piece holder of claim 9, wherein the bracket includes a handle.

18. A method of using a work piece holder to support a work piece, the method comprising:
positioning the work piece in a gap in a bracket, the bracket having a first arm and a second arm, the gap being disposed between the first arm and the second arm, a first portion of the second arm being non-parallel to a first portion of the first arm such that a lower portion of the gap is narrower than an upper portion of the gap;
positioning a wedge in the gap, the wedge having a first side and a second side, the second side configured to engage the first portion of the second arm, the wedge configured to move along the first portion of the second arm, and the first side and the first portion of the first arm configured to cooperate to support the work piece when the work piece is positioned in the gap;

engaging the first portion of the second arm with the second side of the wedge in a tongue-in-groove manner; and moving the wedge along the first portion of the second arm until the first side of the wedge and the first portion of the first arm engage the work piece.

* * * * *